(12) United States Patent
Parekh et al.

(10) Patent No.: US 7,669,017 B1
(45) Date of Patent: Feb. 23, 2010

(54) METHOD OF AND CIRCUIT FOR BUFFERING DATA

(75) Inventors: Hemang Maheshkumar Parekh, San Jose, CA (US); Hai-Jo Tarn, San Jose, CA (US); Gabor Szedo, San Jose, CA (US); Vanessa Yu-Mei Chou, San Jose, CA (US); Jeffrey Allan Graham, Sydney (AU); Elizabeth R. Cowie, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 468 days.

(21) Appl. No.: 11/527,802

(22) Filed: Sep. 27, 2006

(51) Int. Cl.
*G06F 12/00* (2006.01)
(52) U.S. Cl. ........................ 711/154; 708/404
(58) Field of Classification Search .................. 711/154; 708/404
See application file for complete search history.

(56) References Cited

U.S. PATENT DOCUMENTS 6,430,587 B1 *  8/2002  Orling ........................ 708/404
6,687,315 B2 *  2/2004  Keevill et al. ............... 375/341
7,415,584 B2 *  8/2008  Gibb et al. .................. 711/157

OTHER PUBLICATIONS

Newton, H., Newton's Telecom Dictionary, 19th Edition, CMP Books, 2003; p. 638 "Programmable Logic".*

* cited by examiner

*Primary Examiner*—Pierre-Michel Bataille
*Assistant Examiner*—John P Fishburn
(74) *Attorney, Agent, or Firm*—John J. King

(57) ABSTRACT

A method of buffering data in a circuit processing data in both a natural address order and a modified address order is described. The method comprises the steps of storing a first block of data according to a first addressing order of a natural address order or a modified address order; reading the first block of data stored in a buffer according to the other addressing order of the natural address order and the modified address order; and simultaneously writing a second block of data to the buffer in the other addressing order while reading the first block of data stored in a buffer according to the other addressing order.

13 Claims, 6 Drawing Sheets

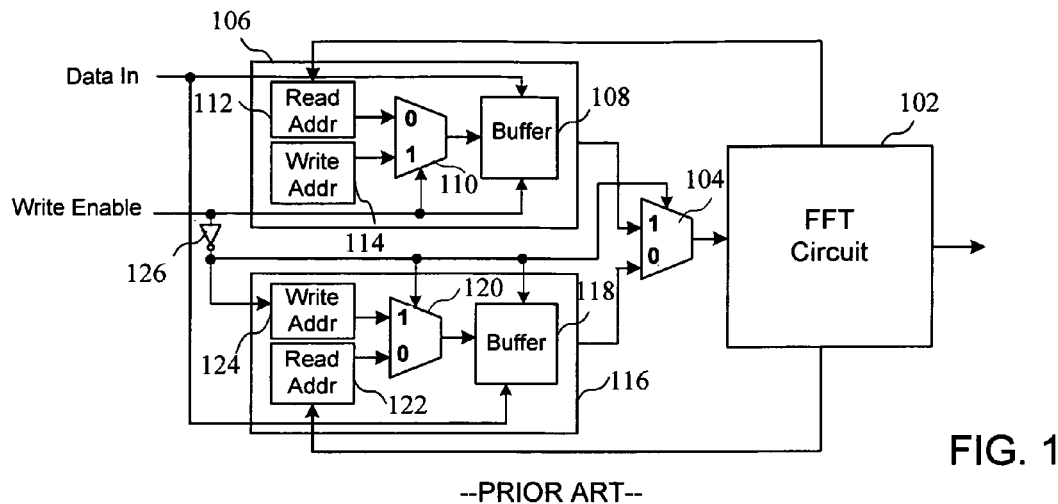
FIG. 1 --PRIOR ART--
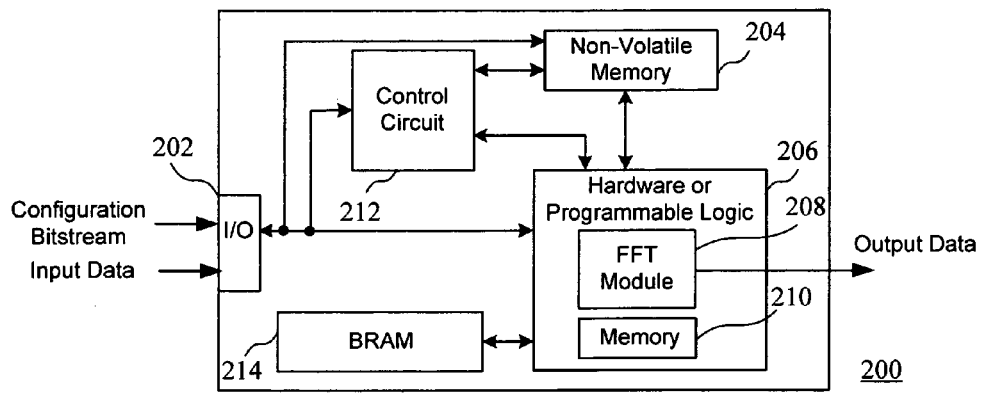
FIG. 2
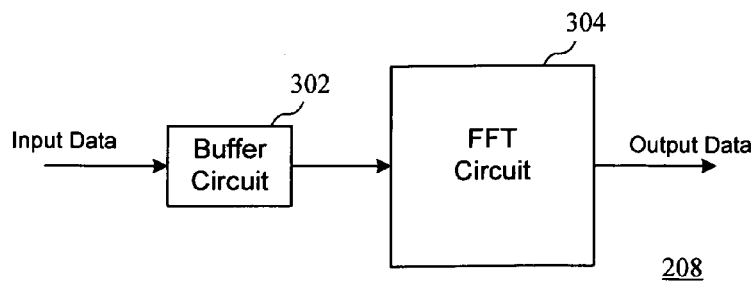
FIG. 3

| First natural write location | | First bit reversed read location | | Second natural write location = first bit reversed location | | Second bit reversed read location | | Third natural write location=second bit reversed location | | Third bit reversed read location | |
|---|---|---|---|---|---|---|---|---|---|---|---|
| 0 | 00000 | 0 | 00000 | 0 | 00000 | 0 | 00000 | 0 | 00000 | 0 | 00000 |
| 1 | 00001 | 16 | 10000 | 16 | 10000 | 1 | 00001 | 1 | 00001 | 16 | 10000 |
| 2 | 00010 | 8 | 01000 | 8 | 01000 | 2 | 00010 | 2 | 00010 | 8 | 01000 |
| 3 | 00011 | 24 | 11000 | 24 | 11000 | 3 | 00011 | 3 | 00011 | 24 | 11000 |
| 4 | 00100 | 4 | 00100 | 4 | 00100 | 4 | 00100 | 4 | 00100 | 4 | 00100 |
| 5 | 00101 | 20 | 10100 | 20 | 10100 | 5 | 00101 | 5 | 00101 | 20 | 10100 |
| 6 | 00110 | 12 | 01100 | 12 | 01100 | 6 | 00110 | 6 | 00110 | 12 | 01100 |
| 7 | 00111 | 28 | 11100 | 28 | 11100 | 7 | 00111 | 7 | 00111 | 28 | 11100 |
| 8 | 01000 | 2 | 00010 | 2 | 00010 | 8 | 01000 | 8 | 01000 | 2 | 00010 |
| 9 | 01001 | 18 | 10010 | 18 | 10010 | 9 | 01001 | 9 | 01001 | 18 | 10010 |
| 10 | 01010 | 10 | 01010 | 10 | 01010 | 10 | 01010 | 10 | 01010 | 10 | 01010 |
| 11 | 01011 | 26 | 11010 | 26 | 11010 | 11 | 01011 | 11 | 01011 | 26 | 11010 |
| 12 | 01100 | 6 | 00110 | 6 | 00110 | 12 | 01100 | 12 | 01100 | 6 | 00110 |
| 13 | 01101 | 22 | 10110 | 22 | 10110 | 13 | 01101 | 13 | 01101 | 22 | 10110 |
| 14 | 01110 | 14 | 01110 | 14 | 01110 | 14 | 01110 | 14 | 01110 | 14 | 01110 |
| 15 | 01111 | 30 | 11110 | 30 | 11110 | 15 | 01111 | 15 | 01111 | 30 | 11110 |
| 16 | 10000 | 1 | 00001 | 1 | 00001 | 16 | 10000 | 16 | 10000 | 1 | 00001 |
| 17 | 10001 | 17 | 10001 | 17 | 10001 | 17 | 10001 | 17 | 10001 | 17 | 10001 |
| 18 | 10010 | 9 | 01001 | 9 | 01001 | 18 | 10010 | 18 | 10010 | 9 | 01001 |
| 19 | 10011 | 25 | 11001 | 25 | 11001 | 19 | 10011 | 19 | 10011 | 25 | 11001 |
| 20 | 10100 | 5 | 00101 | 5 | 00101 | 20 | 10100 | 20 | 10100 | 5 | 00101 |
| 21 | 10101 | 21 | 10101 | 21 | 10101 | 21 | 10101 | 21 | 10101 | 21 | 10101 |
| 22 | 10110 | 13 | 01101 | 13 | 01101 | 22 | 10110 | 22 | 10110 | 13 | 01101 |
| 23 | 10111 | 29 | 11101 | 29 | 11101 | 23 | 10111 | 23 | 10111 | 29 | 11101 |
| 24 | 11000 | 3 | 00011 | 3 | 00011 | 24 | 11000 | 24 | 11000 | 3 | 00011 |
| 25 | 11001 | 19 | 10011 | 19 | 10011 | 25 | 11001 | 25 | 11001 | 19 | 10011 |
| 26 | 11010 | 11 | 01011 | 11 | 01011 | 26 | 11010 | 26 | 11010 | 11 | 01011 |
| 27 | 11011 | 27 | 11011 | 27 | 11011 | 27 | 11011 | 27 | 11011 | 27 | 11011 |
| 28 | 11100 | 7 | 00111 | 7 | 00111 | 28 | 11100 | 28 | 11100 | 7 | 00111 |
| 29 | 11101 | 23 | 10111 | 23 | 10111 | 29 | 11101 | 29 | 11101 | 23 | 10111 |
| 30 | 11110 | 15 | 01111 | 15 | 01111 | 30 | 11110 | 30 | 11110 | 15 | 01111 |
| 31 | 11111 | 31 | 11111 | 31 | 11111 | 31 | 11111 | 31 | 11111 | 31 | 11111 |

FIG. 4

METHOD OF AND CIRCUIT FOR BUFFERING DATA

FIELD OF THE INVENTION

The present invention relates generally to integrated circuits, and in particular, to a method of and circuit for buffering data in a circuit which processes data in both a natural address order and a modified address order.

BACKGROUND OF THE INVENTION

Data may be transmitted according to one of many data transfer protocols. Data transfer protocols generally include protocols defined by industry standards bodies or proprietary protocols. While different protocols may have advantages and disadvantages, a data transmission protocol may be selected to optimize the transmission of data according to the application using the protocol. Various digital communications standards such as IEEE 802.11, IEEE 802.16, or Digital Video Broadcasting-Terrestrial (DVB-T) use Fourier Transforms, and in particular use Fourier Transforms as part of Orthogonal Frequency Division Multiplexing (OFDM) systems. Various implementations of Fourier transforms are provided in a set of algorithms called Fast Fourier Transforms (FFT). The inverse operation of a Fast Fourier Transform is called Inverse Fast Fourier Transform (IFFT). FFT algorithms may be implemented using Radix-2, Radix-4, or some other Radix algorithm.

In uniform implementations of forward FFT or inverse FFT, if the input data to the FFT algorithm is provided from a bit or digit reversed address index (as is the case with decimation in time FFT algorithm, for example), then the output data of FFT is in a natural order address indexing order. Similarly if the input is in a natural order (as is the case with decimation in frequency FFT algorithm, for example), the output of FFT is in a bit or digit reversed order. Bit reversed order is based on binary number representation of the index. A 16 point FFT block has 16 data values represented by an index of 0, 1, 2, 3 . . . , 14, 15. These 16 index values are represented in binary as 0000, 0001, 0010, . . . , 1110, 1111, as is well known. A corresponding bit reversed index is generated by reversing the order of the binary bits to represent the bit reversed index. Accordingly, the natural index as previously shown corresponds to a bit reversed order of 0000, 1000, 0100, . . . , 0111, 1111. That is, the binary value 0001 corresponding to the decimal value of "1" will be represented in bit-reversed order as a binary value of 1000. Similarly, the binary value 0010 corresponding to the decimal value of "2" will be represented in bit reversed order as a binary value of 0100. Therefore, the sequence of consecutive decimal integers from 0-15 translates to the decimal values 0, 8, 4, . . . 7, 15 in bit reversed order. Accordingly, for a given order of indexing of FFT input data, the output data of the FFT will be in a modified indexing order for that 16 value block. For Radix-2 algorithms, bit reversed ordering is possible. However, it is possible to reverse and shift group of bits in the memory address generation logic to be able to support other radices. For higher radix implementations, digit reversed ordering is used. Digit reversed order is another form of a modified address order, where instead of a group of 1 bit, it has a group of 2 or more bits which are reversed. Because Radix-4 will have a 4 digit value grouping (0, 1, 2, 3), the reversed ordering is in groups of 2 bits. Similarly, the reversed ordering in Radix-8 will be in group of 3 bits.

In any application requiring bit or digit reversion, bit-reversed to natural conversion or natural to bit reversed conversion is needed at either the input or at the output. For an N point FFT circuit, N values of data have to be stored to convert from natural to bit reversed order, typically at the FFT circuit's input. If the FFT circuit operates in burst mode, for example in a loop engine implementation, then the FFT circuit will generate the 1024 value results. The natural to bit reversed order conversion will start, and once the conversion is completed, the FFT circuit will process the next block of data. However, an FFT circuit needs to read the data from a buffer space which does not interfere with the natural to bit reversed order conversion. Conventional circuits implementing an FFT circuit have used double buffering, commonly called ping pong buffering. As shown for example in FIG. 1, an FFT circuit 102 is coupled by a multiplexer 104 to receive the output of a first buffer circuit 106. The buffer circuit 106 comprises a buffer 108 coupled to receive an address at the output of a multiplexer 110, which is coupled to receive a read address from a read address circuit 112 and a write address from a write address circuit 114. Similarly, a buffer circuit 116 comprises a buffer 118 coupled to receive the output of a multiplexer 120, which is coupled to receive either a read address from a read address circuit 122 and a write address from a write address circuit 124.

A write enable signal coupled to an inverter 126 is used to select whether a read address or write address is coupled to the buffers, which are also enabled by the write enable signal. The read address circuits 112 and 122 are controlled by the FFT circuit 102. As can be seen in the conventional circuit of FIG. 1, two buffers are required, where each buffer receives a separate read or write address. Accordingly, while a first buffer circuit is storing data in a first order, such as a natural order, the FFT circuit accesses the second buffer circuit which enables a natural-to-bit reversed conversion of the data stored in the buffer by allowing the data to be read in the bit reversed order. After the data is read from the second buffer circuit, the FFT circuit will then switch and a natural-to-bit reversed conversion of the data stored in the first buffer circuit by allowing that data to be read in the bit reversed order.

However, the circuit of FIG. 1 is an inefficient use of resources. For example, the dual buffer requirement and additional logic to control both read and write addresses to both buffers increases the circuit requirement to implement the FFT circuit. Such additional circuitry can be particularly costly in certain circuits where resources must be used efficiently. For example, in a programmable logic device where the efficient use of available logic resources is important, the additional circuitry is particularly inefficient.

Accordingly, there is a need for an improved method of and circuit for buffering data.

SUMMARY OF THE INVENTION

A method of buffering data in a circuit processing data in both a natural address order and a modified address order is described. The method comprises the steps of storing a first block of data according to a first addressing order of a natural address order or a modified address order; reading the first block of data stored in a buffer according to the other addressing order of the natural address order and the modified address order; and simultaneously writing a second block of data to the buffer in the other addressing order while reading the first block of data stored in a buffer according to the other addressing order. The reading of the first block of data and simultaneously writing the second block of data may comprise performing a read before write operation in a random access memory. The method of claim 1 further comprising reading the second block of data from the buffer in the first addressing order, and simultaneously writing a third block of data to the buffer in the first addressing order while reading the second block of data from the buffer in the first addressing order.

According to an alternate embodiment, a method of buffering data in a circuit processing data in both a natural address order and a modified address order may comprise storing a first block of data in a burst data mode according to a first addressing order of a natural address order or a modified address order; reading the first block of data stored in a buffer according to the other addressing order of the natural address order and the modified address order; writing a second block of data to the buffer in the other addressing order after a gap in data while reading the first block of data stored in a buffer according to the other addressing order; and writing a remaining portion of the second block of data after the first block of data has been completely read. The method may further comprise reading predetermined addresses twice in a read only cycle, wherein the address generator will switch between read only and read/write cycles. For example, reading predetermined addresses twice may comprise reading a cyclic prefix of an OFDM system, wherein the gap is at least equal to the time required to send a cyclic prefix.

A circuit having a buffer for buffering data in both a natural address order and a modified address order is also disclosed. The circuit comprises a buffer storing a plurality of data words at a plurality of addresses; a counter coupled to receive an enable signal and generate an address; a bit reversal circuit coupled to receive the address and generate a modified address comprising reversed bits of the address; and a multiplexer coupled to the counter and the bit reversal circuit, wherein the multiplexer is controlled to select one of the address or the modified address. According to alternate embodiments, circuits for buffering data in bursts and data which may need to be re-read are disclosed.

BRIEF DESCRIPTION OF THE DRAWINGS

FIG. 1 is a block diagram of a conventional circuit for buffering data;

FIG. 2 is a block diagram of a circuit having programmable logic implementing a circuit for buffering data according to an embodiment of the present invention;

FIG. 3 is a block diagram of a circuit for buffering data according to an embodiment of the present invention;

FIG. 4 is a table showing an example of reading and writing data according to an embodiment of the present invention;

DETAILED DESCRIPTION OF THE DRAWINGS

Figure 5:
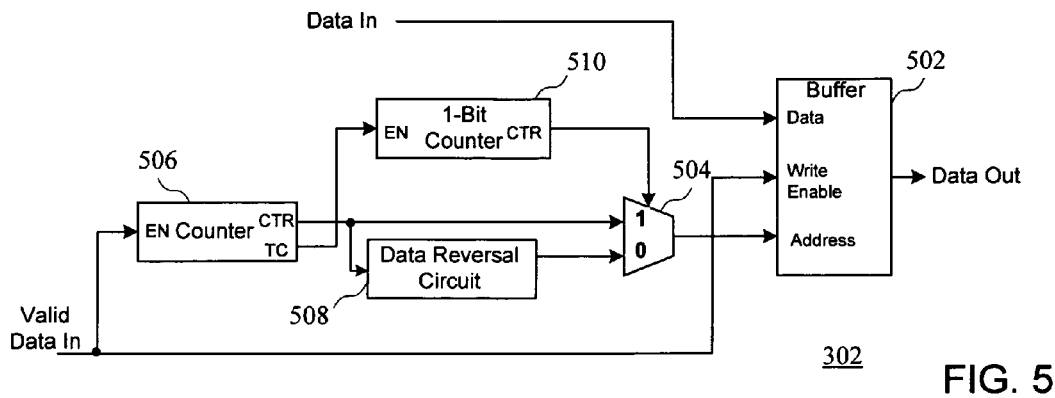
FIG. 5 is a block diagram of the buffer circuit 304 according to an embodiment of the present invention.

Turning first to FIG. 2, a block diagram of a circuit having programmable logic implementing a circuit for buffering data according to an embodiment of the present invention is shown. In particular, a system 200 comprises an input/output (I/O) port 202 which is coupled to receive a configuration bitstream and input data. The input data may comprise data processed by an FFT circuit, for example. The configuration bitstream may be directly coupled to a non-volatile memory 204, enabling programming of a logic circuit 206 if the logic circuit comprises programmable logic. The logic circuit 206 may comprise an FFT module 208 and a memory 210. Alternatively, the bitstream may be coupled directly to the logic circuit 206 or may be coupled to a control circuit 212. The operation of the FFT module 208 will be described in more detail below in reference to FIGS. 3-7. The system 200 may be an integrated circuit having both a control circuit and a non-volatile memory for programming programmable logic, for example. In particular, the system 200 may be a programmable logic device such as a field programmable gate array (FPGA) or a complex programmable logic device (CPLD), or an application specific integrated circuit (ASIC) having programmable logic. Alternatively, the system 200 may be a printed circuit board or other type of circuit board having a plurality of integrated circuits including a control circuit, a non-volatile memory and a programmable logic device.

Figure 6:
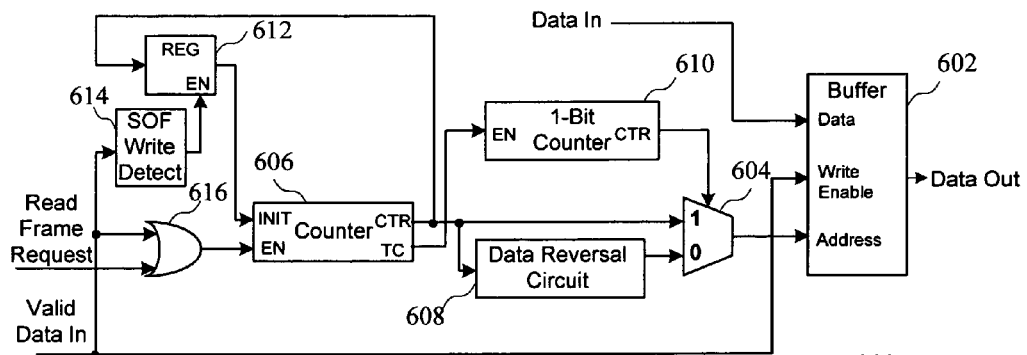
FIG. 6 is a block diagram of the buffer circuit 304 enabling data bursts according to an alternate embodiment of the present invention.
Figure 7:
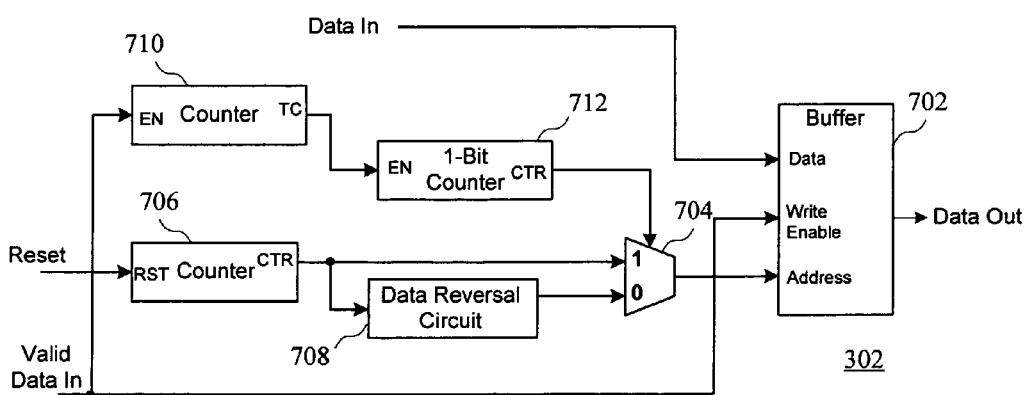
FIG. 7 is a block diagram of the buffer circuit 304 enabling re-reading data according to an alternate embodiment of the present invention.

Turning now to FIG. 3, a block diagram of a circuit for buffering data according to an embodiment of the present invention is shown. As shown in FIG. 3, the FFT module 208 comprises a single buffer circuit 302 coupled to an FFT circuit 304. Although the buffer circuit is shown at the input of the FFT, the buffer could also be at the output of the FFT circuit to provide the conversion of data between different addressing orders. Rather than converting natural order addresses to reversed order addresses when reading data from the buffer to be input to an FFT circuit, the data output by the FFT may be buffered, where the buffered data may be read out using a reversed order addressing. That is, because the data read into the FFT circuit will be in a natural addressing order, the output of the FFT circuit will be in a reversed addressing order. Therefore, the buffered data written in reverse order will also be read out again in reverse order, resulting in an output which is in a natural address order. As will be described in more detail below, the FFT module of FIG. 3 enables the reading and writing of information using a single buffer and address circuit. That is, the circuit of FIG. 3 enables reading and writing data according to addressing details shown in the table of FIG. 4. Specific circuits for enabling the reading and writing of data according to the table of FIG. 4 are shown in FIGS. 5-7, as will be described in more detail below.

The table of FIG. 4 shows a simple case for a 32 point FFT circuit to show the details of the natural and bit reversed address indexing. For a 32 point FFT circuit, there are only 32 input values and hence the binary representation for such indexing can be shown with just 5 bits. Each column represents a memory of 32 locations, wherein the memory location are written to or read from based upon the index value, also known as an address for the locations; that is, the contents of the table are the index of the data in the 32 locations. As can be seen, the state of the memory after the first write operation of natural order input data is shown in both decimal and binary representations in first two columns and indicated by a common header for those two columns. As can be seen, the memory needs to be read during the first read operation. The third and fourth columns indicate the bit reversed read indexing scheme; that is, the binary address of the first value that is read is 00000, the binary address of the second value which is read is 10000, etc. The next write order should be using the same memory write addressing index as the previous read address order so that the contents may be read out while writing new values into those same locations, as shown in the fifth and sixth columns. This may be accomplished as will be described in more detail below using a read before write function of a memory. The second read operation should now be in bit reversed indexed order of the second write address index order. Because bit reversed order of a bit reversed order index results in a natural order index, the seventh and eighth columns show that this second read operation is in fact reading from naturally located memory cells to read bit reversed order write data. As will be described in more detail below in reference to FIGS. 5-7, because a read before write function is used, the data will be written to the memory in the order in which the data is being read. Therefore, when the data is read in a bit reversed order, the data is also written to the memory in a bit reversed order. Accordingly, that data need only be read out in the order in which it was written (i.e. a bit reversed order). As will be described in reference to the circuits of FIGS. 5-7, the bits of the output of the counter generating the address will only be reversed on every other read cycle. The third write will now be the same as the first two columns, and the process is repeated. Thus only 32 memory cells are needed to store the data for natural to bit reversed order conversion in a 32 point FFT circuit. While the example of the table of FIG. 4 used the Radix-2, the methods and circuits of the present application are equally applicable to other radix implementations and other multi-stream I/Os implementations.

Turning now to FIG. 5, a block diagram of the buffer circuit 302 according to an embodiment of the present invention is shown. According to the embodiment of FIG. 5, a single port buffer may be used when converting data received in bit or digit reversed addressing index to natural order addressing index or vice versa. A buffer 502 is coupled to receive input data at a data terminal and an address comprising a normal or bit reversed index value at an address terminal. The buffer 502 may comprise any addressable memory element, such as a random access memory having a read before write feature. The address is selected by a multiplexer 504 which is coupled to select the count output CTR of a counter 506 or the output of a bit reversal circuit 508. The data reversal circuit 508 reverses the bits or digits of the index as described above. The data reversal circuit may be configured to provide bit reversal, digit reversal, or some other modification which, when applied to the modified data, will result in the original data. A one-bit counter 510 coupled to the terminal count (TC) of the counter 506 will toggle between the two inputs to the multiplexer 504 so that data will always be read from the buffer in the same order. This output of the one-bit counter 510 controls the select port of the multiplexer and thus toggling the address into the buffer. Accordingly, the address to the buffer will alternate between natural order and a modified order, such as bit reversed order or digit reversed order depending upon the application. Mapping the example shown in the table of FIG. 4 to the circuit in FIG. 5, the 1-bit counter 510 will toggle after the counter 508 reaches a count of 32. On every cycle, the previous content at the address to which the new value is written is read and available at the output port of the buffer as well. This read before write feature of the buffer ensures that the new data written to the same location does not corrupt the data previously residing at that location. As described earlier with respect to FIG. 4, because a second block of data is written to a block of memory as the data is read from the memory using a read-before-write feature of a RAM, each consecutive operation of reading the block of data, for example 32 words, is in the reverse order. Therefore, the circuit of FIG. 5 solves the requirement of using double buffering and also reduces the need for logic required to control the read and write operation for both buffers.

In operation, the circuit of FIG. 5 enables a streaming FFT which continuously generates one output for each input it receives. While there will be some computational latency involved, the results will appear every clock cycle after a latency of K cycles. In a 32 point FFT configuration, for example, the natural order indexed value will generally require a full 32 cycles to be stored before the bit reversed indexed results can be read out of that storage. As soon as FFT has generated the first 32 values, the next 32 values are also being generated starting from the next cycle. Accordingly, the next block of data should be stored in the same locations, where the FFT module reads the data from. The process of writing to the buffer location where the read operation is performed is carried out continuously in the embodiment of FIG. 5.

Further describing the operation of the circuit of FIG. 5, the data is input to the circuit of FIG. 5 and a single bit Valid Data In (VIN) signal is used to indicate the validity of the data. This VIN signal enables a 5 bit counter for 32 point address location generation. This modulo 32 counter also generates a terminal count (TC) signal which indicates when the counter has counted 32 times. The output bits of the counter 506 and their reversed bits are coupled to the 2:1 multiplexer 504. The TC signal acts as an enable to the 1-bit counter 510. This 1-bit counter alternates between 0 and 1, where each state lasts for 32 clock cycles. One advantage of the circuit of FIG. 5 is that only a single block size, single port memory is needed. Thus, for fixed sized memories available as chips or on-chip in FPGAs or processors, the circuit of FIG. 5 allows efficient utilization of processing cycles and memory space. For circuits that offer dual port memory, such as FPGAs from Xilinx, Inc. of San Jose, Calif., two such modules may be implemented on a single dual ported memory if the memory size can store two blocks of data, where each block of data may be a different size. While the circuit of FIG. 5 enables streaming FFT mode, other circuits enable data transmitted in bursts, as will be described below in more detail in reference to FIG. 6.

Turning now to FIG. 6, a block diagram of the buffer circuit 302 enabling data bursts according to an alternate embodiment of the present invention is shown. The circuit of FIG. 6 enables the processing of data if the data is not continuous in nature, such as data which is transmitted in bursts. The processing of data in bursts may be performed by halting the read operations until the next set of new data is required to be written to this memory. Accordingly, whenever the next "write the new block" operation occurs, the results of the previous block are available. Alternatively, if the data needs to be read after the current block has been completely written into the buffer, but before the new block is written into the memory, the reading may be performed as shown in FIG. 6, which is a modification of the circuit of FIG. 5. That is, the circuit of FIG. 6 may be used where it might be acceptable to have a non-uniform latency between input to the FFT algorithm and the output of FFT algorithm. The circuit may start the read operation during the inter-burst gap. If the "write the new block" operation starts while the previous block is not completely read yet, the write operation can still write to the location to which the read address is currently pointing. In order to enable the processing of the data in bursts, the circuit of FIG. 6 comprises a buffer 602 which is also coupled to receive input data at a data input and an address at an address input. The address is selected by a multiplexer 604 which is coupled to receive the count output CTR of a counter 606 and the output of a data reversal circuit 608. A one-bit counter 610 coupled to the terminal count (TC) of the counter 606 will toggle to select the two inputs to the multiplexer 604 as described above. The output of the counter 606 is also coupled to a register 612 which is enabled by a start of frame (SOF) write detect circuit 614. Accordingly, an initial value of the count latched by the register 612 will be used when the counter 606 is enabled. An OR gate 616, which receives the VIN signal and a read frame request signal as inputs, generates an output which is coupled to enable the counter 606. Accordingly, the counter is enabled when valid data is detected or a read frame request is detected.

By way of example, the circuit of FIG. 6 may receive a first block of 32 data words which are stored in the buffer in a natural order. After the first block of 32 data words are stored, there may be a request to read the first block of 32 data words, for example in response to a read frame request signal. Unlike the circuit of FIG. 5 which will enable reading a continuous data stream, the circuit of FIG. 6 will allow for the reading of data even if no new data is written by enabling the counter 606 to generate a read address in response to receiving the read frame request signal. However, if additional data must be written to the buffer, it is necessary to generate an offset or initial count value to an initial count (INIT) input of the counter 606. This initial count value will indicate the number of words which must be written to complete a write operation of the complete block after the read operation of the previous block is completed. It will provide the initial value for the counter to be used during the next read cycle. Accordingly, when the VIN input is active, enabling writing to the buffer 602, the SOF write detect circuit 614 enables the register 612 to store the current count of the counter 606 in response to receiving the VIN signal. The stored current count of the counter 606 is provided to the counter as an initial count value, enabling the write/read cycle of the 32 data words to be written and read next time around. For example, if there were a gap in writing for 10 cycles while the reading continues during that gap, and the writing of the next block of data were to begin on the eleventh cycle as a read before write operation, the data would continue to be written to 10 address locations after the reading of the 32 data words was completed. After the writing of the additional 10 address locations, a read only operation may be performed, or a read before write operation may be performed if additional 32 data are available to be written to the buffer.

Turning now to FIG. 7, a block diagram of the buffer circuit 302 enabling re-reading data according to an alternate embodiment the present invention is shown. According to the embodiment of FIG. 7, a buffer 702 is coupled to receive input data at a data terminal and an address at an address terminal. The address is selected by a multiplexer 704 which is coupled to receive the count output (CTR) of a free-running counter 706 and the output of a bit reversal circuit 708. The counter 706 receives the reset signal to enable counting at the start of the first frame or after a portion of a frame has been read. The data reversal circuit 708 reverses the bits or digits of the index as described above. A counter 710 is coupled to the VIN signal at an enable signal and generates a terminal count signal to an enable input of the one-bit counter 710 to toggle the control signal of the multiplexer 704.

According to the embodiment of FIG. 7, data may be re-read, as is required according to certain data standards, such as OFDM systems where sometimes one quarter of the data must be re-read. In a circumstance when the data must be re-read, data may not be written for a period equal to the period for which data must be re-read. Accordingly, a gap in writing is necessarily created according to the circuit of FIG. 7. By way of example, in an OFDM system transmitting 32 word blocks, 8 words, such as the last 8 words of the block are read as a cyclic prefix before the entire 32 word block is read. The free running counter 706 receives a reset signal, which may be active in response to a signal indicating an initial start of a write frame or an inverted read frame request signal. That is, a read frame request signal will be active whenever the cyclic prefix of a block of words and then the complete block of words needs to be read. The VIN signal remains low during the reading of the prefix data to ensure that the prefix data is not overwritten as a part a read before write operation, but rather is available to be read during the complete reading of the block of data. When the VIN signal is received, the counter 710 will count, generating a terminal count after a complete write cycle as described above in FIG. 5. As can be seen, in addition to enabling the re-reading of data, the circuit of FIG. 7 provides an alternate circuit for reading data which is received in bursts. That is, the free running counter can enable reading data even when valid data is not being written to the buffer Turning now to FIG. 8, a block diagram of a programmable logic device employing a buffer circuit according to an embodiment of the present invention is shown. The FPGA architecture 800 of FIG. 8 includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807) (e.g., configuration ports and clock ports), and other programmable logic 808 such as digital clock managers, analog-to-digital converters, system monitoring logic, and so forth. Some FPGAs also include dedicated processor blocks (PROC 810). The circuits of FIGS. 5-7 may be implemented fully or partially in CLBs 802.

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element (INT 811) also includes the connections to and from the programmable logic element within the same tile, as shown by the examples included at the top of FIG. 8.

For example, a CLB 802 may include a configurable logic element (CLE 812) that may be programmed to implement user logic plus a single programmable interconnect element (INT 811). A BRAM 803 may include a BRAM logic element (BRL 813) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 706 may include a DSP logic element (DSPL 814) in addition to an appropriate number of programmable interconnect elements. An IOB 804 may include, for example, two instances of an input/output logic element (IOL 815) in addition to one instance of the programmable interconnect element (INT 811).

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA. Some FPGAs utilizing the architecture illustrated in FIG. 8 include additional logic blocks that disrupt the regular columnar structure making up a large part of the FPGA. The additional logic blocks may be programmable blocks and/or dedicated logic. For example, the processor block PROC 810 shown in FIG. 8 spans several columns of CLBs and BRAMs.

Figure 8:
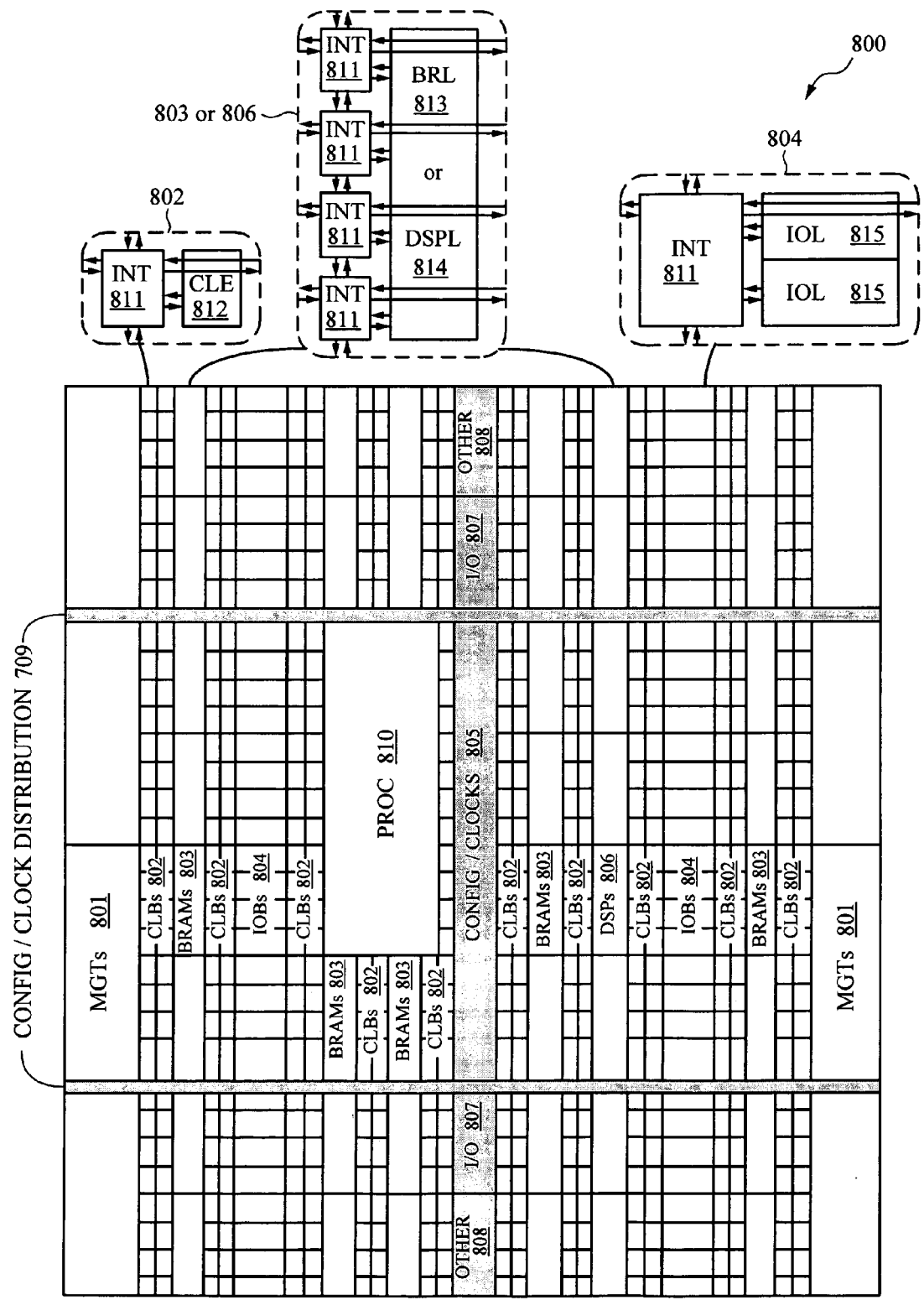
FIG. 8 is a block diagram of a programmable logic device employing a buffer circuit according to an embodiment of the present invention.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of integrated circuit having programmable logic.

Figure 9:
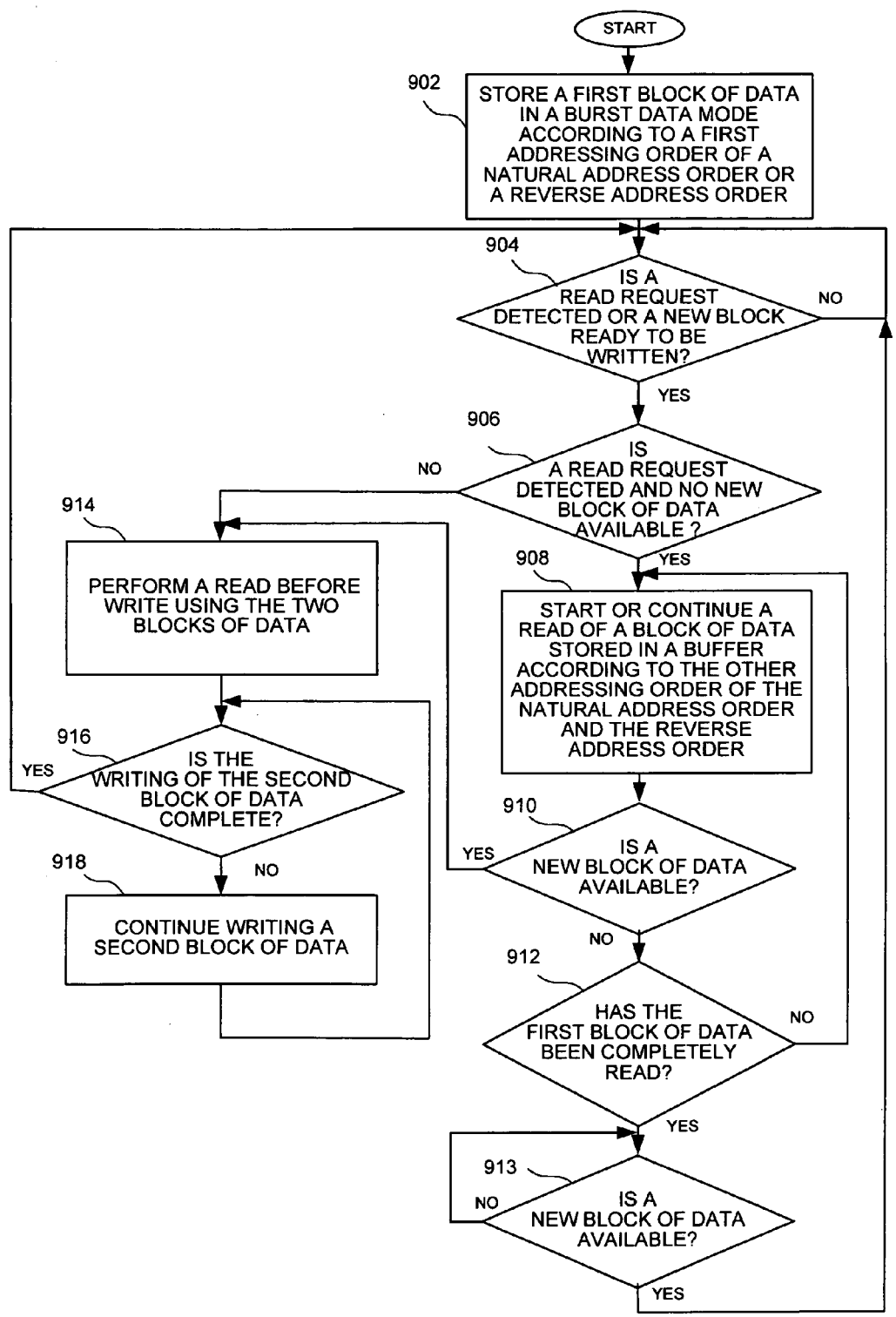
FIG. 9 is a flow chart showing a method of buffering data according to an embodiment of the present invention.

Turning now to FIG. 9 is a flow chart shows a method of buffering data according to an embodiment of the present invention. In particular, a first block of data in a burst data mode is stored according to a first addressing order of a natural address order or a reversed address order at a step 902. It is determined whether a read request detected or a new block ready to be written at a step 904. If either one is available, it is then determined whether a read request detected and no new block of data available at a step 906. If a read request is detected and no new block of data is available, a read of the first block of data stored in a buffer is started according to the other addressing order of the natural address order and the reversed address order at a step 908. It is then determined whether a new block of data available at a step 910. If no new block of data is available, it is also determined whether the first block of data been completely read at a step 912. If the first block of data has not been completely read, the circuit continues to read the data at the step 908. If the data has been completely read, it is then determined whether a new block of data is available at a step 913. If a new block of data is available at the step 913 the process returns to step 904. If a new block of data is available at step 910, a read before write is performed using the two blocks of data at a step 914. Finally, it is determined whether the writing of the second block of data is complete at a step 916. If not, the circuit continues to write the second block of data at a step 918. When the writing of the second block of data is complete at step 916, the process returns to step 904 to determine whether a read request detected or a new block is ready to be written.

Figure 10:
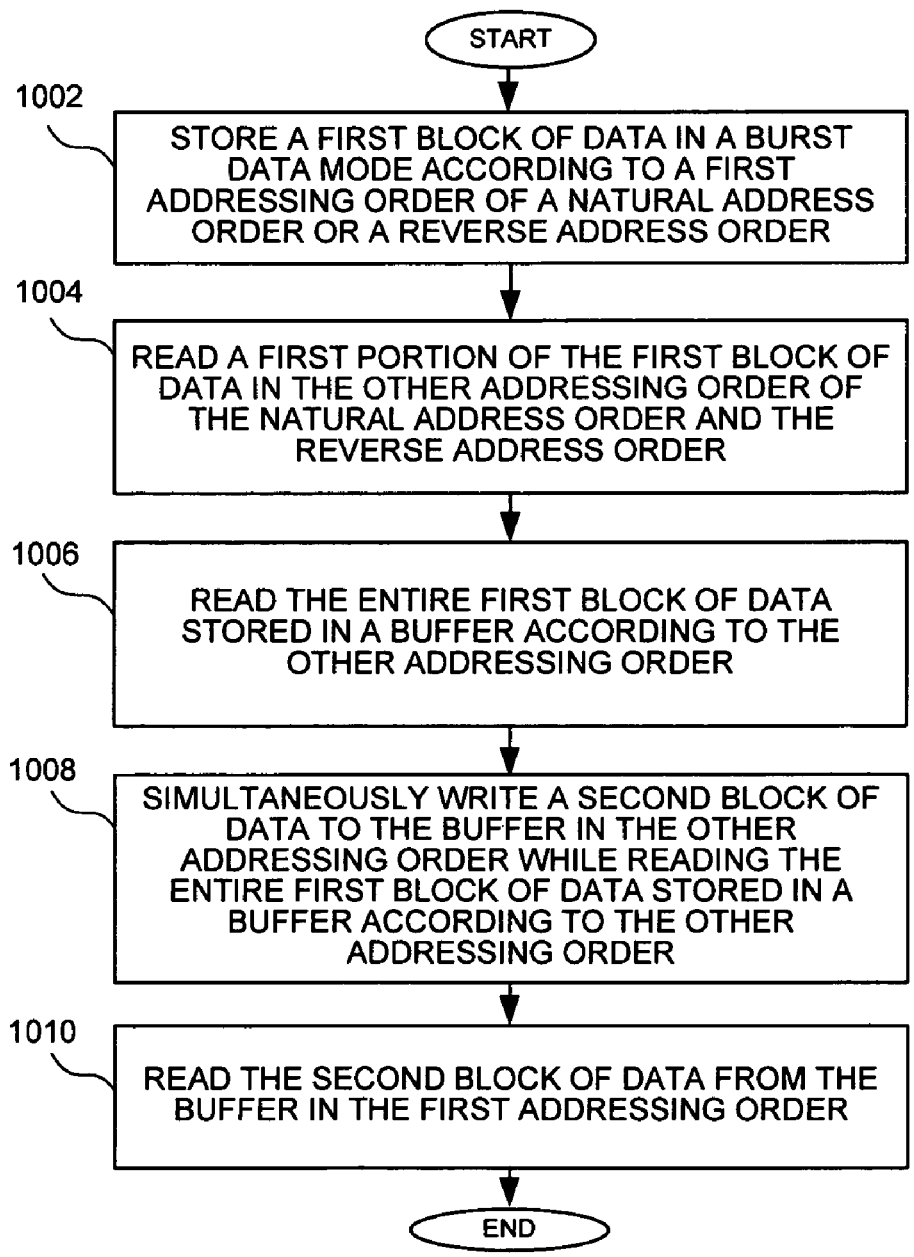
FIG. 10 is a flow chart showing a method of buffering data according to an alternate embodiment the present invention.

Finally, turning now to FIG. 10, a flow chart shows a method of buffering data according to an alternate embodiment the present invention. In particular, a first block of data read in a burst data mode is stored according to a first addressing order of a natural address order or a reversed address order at a step 1002. A portion of the first block of data is read according to the other addressing order of the natural address order and the reversed address order at a step 1004. The entire first block of data stored in a buffer is read according to the other addressing order at a step 1006. A second block of data is simultaneously written to the buffer in the other addressing order whenever available in a burst while reading the entire first block of data stored in a buffer according to the other addressing order at a step 1008. A portion of the second block of data is read according to the first address order and then the second block of data is read from the buffer in the first addressing order at a step 1010. The methods of FIGS. 9 and 10 may be implemented using any circuits of FIGS. 1-8 as described, or any other suitable circuits.

It can therefore be appreciated that the new and novel method of and circuit for buffering data has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of buffering data in a circuit processing data in both a natural address order and a modified address order, the method comprising:

storing a first block of data according to a first addressing order of a natural address order or a modified address order;

reading a portion of the first block of data stored in the buffer according to the other addressing order of the natural address order and the modified address order;

reading the entire first block of data stored in a buffer according to the other addressing order of the natural address order and the modified address order; and simultaneously writing a second block of data to the buffer in the other addressing order while reading data of the first block of data stored in the buffer according to the other addressing order, wherein writing is disabled when reading the portion of the first block during the step of reading the portion of the first block of data.

2. The method of claim 1 further comprising reading the second block of data from the buffer in the first addressing order.

3. The method of claim 2 further comprising simultaneously writing a third block of data to the buffer in the first addressing order while reading the second block of data from the buffer in the first addressing order.

4. The method of claim 1 further comprising processing the first block of data in a data streaming mode according to a Fourier transform function.

5. The method of claim 1 wherein reading data of the first block of data and simultaneously writing the second block of data comprise performing a read before write operation in a random access memory.

6. The method of claim 1 wherein reading the entire first block of data comprises reading the first block of data according to a bit reversed address indexing.

7. The method of claim 1 wherein reading the entire first block of data comprises reading the first block of data according to reversed address indexing based upon a group of bits.

8. A circuit having a buffer for buffering data in both a natural address order and a modified address order, the circuit comprising:

a buffer storing a plurality of data words at a plurality of addresses, the buffer receiving a valid data input signal at a write enable input;

a first counter generating an address;

a bit reversal circuit coupled to receive the address and generate a modified address comprising reversed bits of the address;

a multiplexer coupled to the first counter and the bit reversal circuit, wherein the multiplexer is controlled to select one of the address or the modified address; and a second counter coupled to a selection input of the multiplexer, the second counter switching between the address and the modified address based upon a count enabled by the valid data input signal.

9. The circuit of claim 8 wherein the second counter comprises a one-bit counter coupled to receive a terminal count output of the first counter and generate a control signal to select one of the address or the modified address.

10. The circuit of claim 8 wherein the first counter comprises a reset for enabling reading predetermined addresses twice.

11. The circuit of claim 10 further comprising a third counter coupled to said a second counter and generating a terminal count value.

12. The circuit of claim 11 wherein said second counter comprises a one-bit counter coupled to receive the terminal count value of the third counter and generate a control signal coupled to select one of the address or the modified address.

13. The circuit of claim 8 further comprising a register coupled to store an initial count value for the first counter.

* * * * *